United States Patent
Mayo

(10) Patent No.: US 7,257,855 B2
(45) Date of Patent: Aug. 21, 2007

(54) DEVICE FOR WASHING SIDE WINDOWS OF A VEHICLE

(76) Inventor: Kevin R. Mayo, 7628 Flourish Springs St., Las Vegas, NV (US) 89131

( * ) Notice: Subject to any disclaimer, the term of this patent is extended or adjusted under 35 U.S.C. 154(b) by 209 days.

(21) Appl. No.: 10/950,753

(22) Filed: Sep. 27, 2004

(65) Prior Publication Data

US 2006/0064837 A1    Mar. 30, 2006

(51) Int. Cl.
*B60S 1/56* (2006.01)
*B60S 1/46* (2006.01)
*B60S 1/44* (2006.01)
*B60S 1/26* (2006.01)

(52) U.S. Cl. ............... 15/250.04; 15/250.01; 15/250.22; 15/250.1; 15/250.29; 15/250.28

(58) Field of Classification Search ........... 15/250.1, 15/250.28, 250.22, 250.01, 250.4, 250.001, 15/250.04, 250.29; 49/476.1, 502, 475.1
See application file for complete search history.

(56) References Cited

U.S. PATENT DOCUMENTS

| | | | | | |
|---|---|---|---|---|---|
| 3,513,499 | A | * | 5/1970 | Termaat et al. | 15/250.01 |
| 3,545,027 | A | * | 12/1970 | Rulapaugh et al. | 15/250.04 |
| 3,548,440 | A | * | 12/1970 | Kothari | 15/250.01 |
| 3,871,049 | A | * | 3/1975 | Workman | 15/250.04 |
| 5,771,526 | A | * | 6/1998 | Burton | 15/250.19 |
| 5,979,010 | A | * | 11/1999 | Dockery et al. | 15/250.04 |

FOREIGN PATENT DOCUMENTS

JP     60-252042    * 12/1985

* cited by examiner

*Primary Examiner*—Gary K. Graham
(74) *Attorney, Agent, or Firm*—Jeffrey D. Moy; Harry M. Weiss; Weiss & Moy, P.C.

(57) ABSTRACT

A side window washing device has a washing unit positioned on each side of the side window and coupled to an interior section of a door frame of the vehicle. The washing unit is capable of dispensing a liquid and moving to clean the side window. A driving unit is coupled to the washing unit. The driving unit is used for dispensing the liquid through the washing unit and for moving the washing unit. A drying unit is positioned above each washing unit and coupled to the interior section of a door frame. The drying unit is used for removing any liquid remaining on the side window.

15 Claims, 2 Drawing Sheets

DEVICE FOR WASHING SIDE WINDOWS OF A VEHICLE

BACKGROUND OF THE INVENTION

1. Field of the Invention

This invention relates to window cleaning devices and, more specifically, to a device which is installed in the doors of a vehicle which will wash and clean the side windows of the vehicle.

2. Description of the Prior Art

Presently, most all vehicles on the road have a windshield wiper system which may be used to clean the front window of the vehicle. Some vehicles even have a windshield wiper system on the rear of the vehicle to clean the rear window. Present windshield wiper systems include a device for spraying water on the window and one or more wipers to remove the water and other debris from the window.

While the above systems do work, there is presently no system available which will wash and clean the side windows on a vehicle. Once a side window becomes dirty, the only way to clean the window is to stop at a gas station or other location and to manually clean the side window with a wet cloth or squeegee. Present windshield wiper systems would not work because of the many different shapes and sizes of the side windows. Furthermore, having a windshield wiper system on the side windows would hinder individuals from lowering the side window when driving.

Therefore, there is a need to provide a side window washing device for vehicles. The side window washing device must overcome problems associated with prior art devices. The side window washing device must be able to wash and clean a side window of a vehicle without hindering a person's ability to lower the side window.

SUMMARY OF THE INVENTION

In accordance with one embodiment of the present invention, it is an object of the present invention to provide a side window washing device for vehicles.

It is another object of the present invention to provide a side window washing device that overcomes the problems associated with prior art devices.

It is still another object of the present invention to provide a side window washing device that is able to wash and clean a side window of a vehicle without hindering a person's ability to lower the side window.

BRIEF DESCRIPTION OF THE EMBODIMENTS

In accordance with one embodiment of the present invention a side window washing device for a vehicle is disclosed. The side window washing device has a washing unit positioned on each side of the side window and coupled to an interior section of a door frame of the vehicle. The washing unit is capable of dispensing a liquid and moving to clean the side window. A driving unit is coupled to the washing unit. The driving unit is used for dispensing the liquid through the washing unit and for moving the washing unit. A drying unit is positioned above each washing unit and coupled to the interior section of a door frame. The drying unit is used for removing any liquid remaining on the side window.

In accordance with another embodiment of the present invention a side window washing device for a vehicle is disclosed. The side window washing device has a washing unit positioned on each side of the side window and coupled to an interior section of a door frame of the vehicle. The washing unit is capable of dispensing a liquid and moving to clean the side window. The washing unit has a circular tube member having a channeling which runs from a first end through a majority of the length of the washing device for transferring the liquid through the washing device. The circular tube member rotates in order to clean the side window. A plurality of spray nozzles are coupled to the circular tube member and in fluid communication with the channeling for dispensing the liquid. A plurality of brushes are coupled to the circular tube member for removing any debris collected on the side window. The side window washing device further has a driving unit coupled to the washing unit for dispensing the liquid through the washing unit and for moving the washing unit. A drying unit is positioned above each washing unit and coupled to the interior section of a door frame for removing any liquid remaining on the side window. A catch pan is located below the washing unit and coupled to the interior of the door frame for collecting any excess liquid. A drainage hole is formed in a bottom section of the catch pan for draining the excess liquid.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
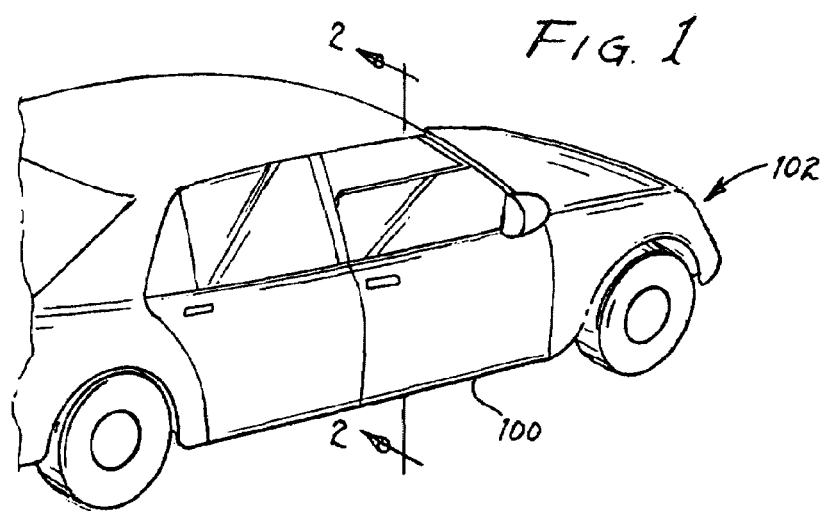
FIG. 1 is an elevated perspective view of a vehicle having the side window washing device of the present invention.
Figure 2:
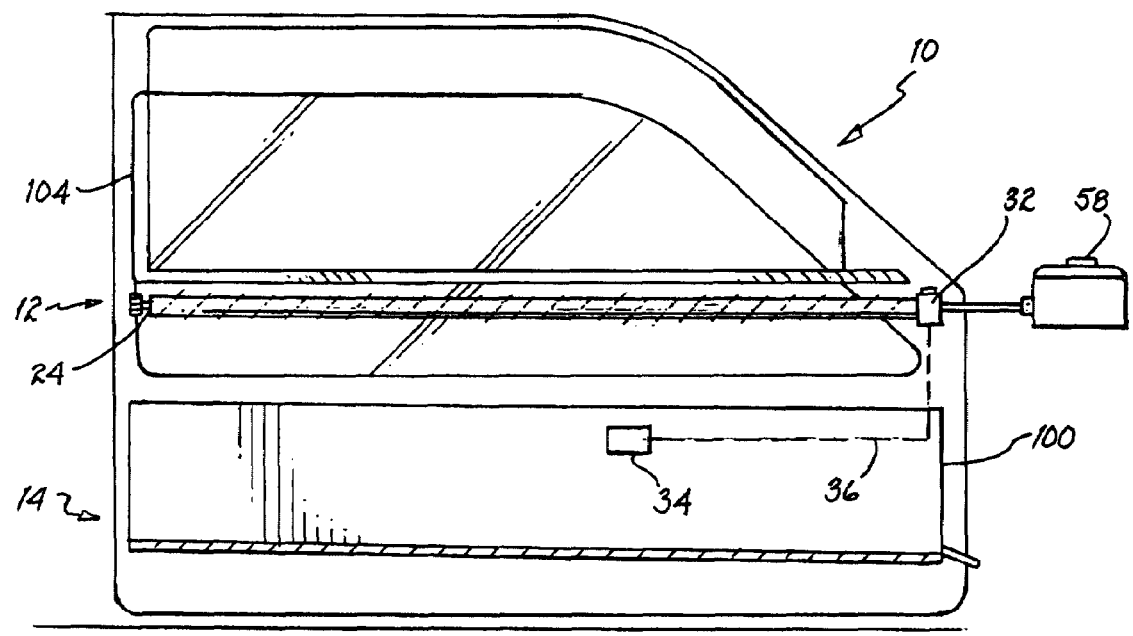
FIG. 2 is a cross-sectional view taken along lines 2-2 of FIG. 1 of the side window washing device of the present invention.
Figure 3:
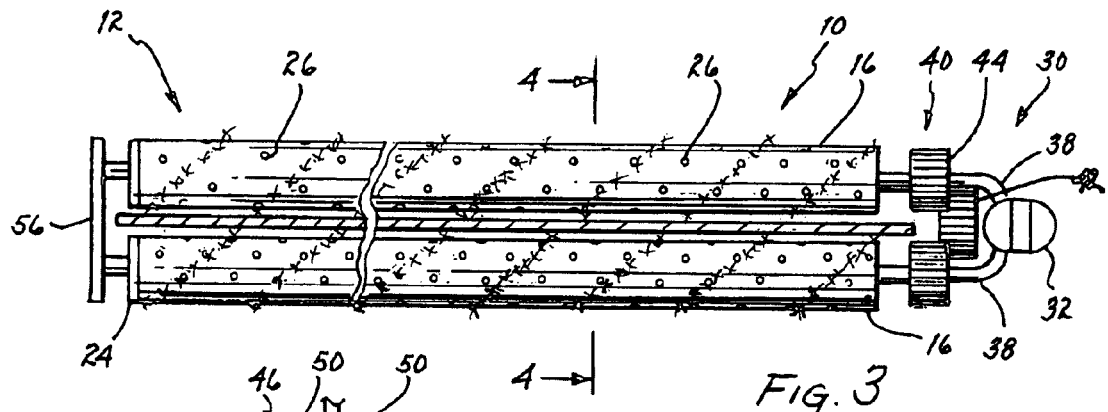
FIG. 3 is a top view of the side window washing device of the present invention.

Referring to the Figures, wherein like numerals and symbols represent like elements, a side window washing device 10 (hereinafter window washing device 10) is shown. The window washing device 10 would be installed in the interior of a door frame 100 of a vehicle 102. The washing device 10 would be able to wash and clean the side window 104 of the vehicle when the side window 104 is lowered and the window washing device 10 is activated.

The window washing device 10 is comprised of a washing and cleaning system 12 and a collection/drainage unit 14. The washing and cleaning system 12 has a pair of washing units 16. A washing unit 16 is positioned on each side of the side window 104. Each washing unit 16 is of a sufficient length to extend across the longest portion of the side window 104.

Each washing unit 16 will have a channeling 18. The channeling 18 starts from a first end 20 of the washing unit 16 and runs a majority of the length of the washing unit 16. The channeling 18 will allow a liquid 22 to flow through the washing unit 16. However, the channeling 18 does not run out a second end 24 of the channeling 18 so that the liquid 22 will not flow out of the second end 24. In operation, the liquid 20 will be a window cleaning solution. However, other liquid solutions may be used without departing from the spirit and scope of the present invention.

The washing unit 16 will have a plurality of spray nozzles 26 located along the length of the washing unit 16. The spray nozzles 26 are in fluid communication with the channeling 18. The spray nozzles 26 are used to dispense and direct the liquid 20 onto the side window 104 when the washing unit 16 is in operation. The spray nozzles 26 will aid in the removal of any debris which may be stuck on the side window 104.

The washing unit 16 will also have a plurality of brushes 28 coupled thereto. The brushes 28 are located along the length of the washing unit 16. The brushes 28 are used to further aid in the removal of any debris which may be stuck on the side window 104.

Both washing units 16 are coupled to a driving mechanism 30. The driving mechanism 30 is used to move the washing unit 16 in order to better clean the side window 104. In accordance with one embodiment of the present invention, both washing units 16 have a circular tube configuration. The driving mechanism 30 is used to rotate the washing units 16. Thus, as the side window 104 is moved in either an up or down motion, the washing units 16 will rotate. The spray nozzles 26 and the brushes 28 move in a rotating manner thereby cleaning the side window 104.

Alternatively, the washing units 16 may have a flat edge configuration. The driving mechanism 30 is then used to move the washing units 16 in a reciprocating motion such as an up and down or a side to side motion. Thus, as the side window 104 is moved in either an up or down motion, the washing units 16 will move in either an up and down or a side to side motion to clean the side window 104.

In the embodiment depicted in the Figures, the driving mechanism 30 is comprised of a small motor/pump 32. The motor/pump 32 has two purposes. First, the motor/pump 32 is used to transfer the liquid from a liquid reservoir 34 to the washing units 16. In general the liquid reservoir 34 is couple to the motor/pump 32 by a conduit 36. The motor/pump 32 will draw the liquid from the liquid reservoir 34 through the conduit 36 and transfer the liquid to each washing unit 16 via a second conduit 38. The liquid is then dispersed through the a plurality of spray nozzles 26 located along the length of the washing unit 16.

Figure 4:
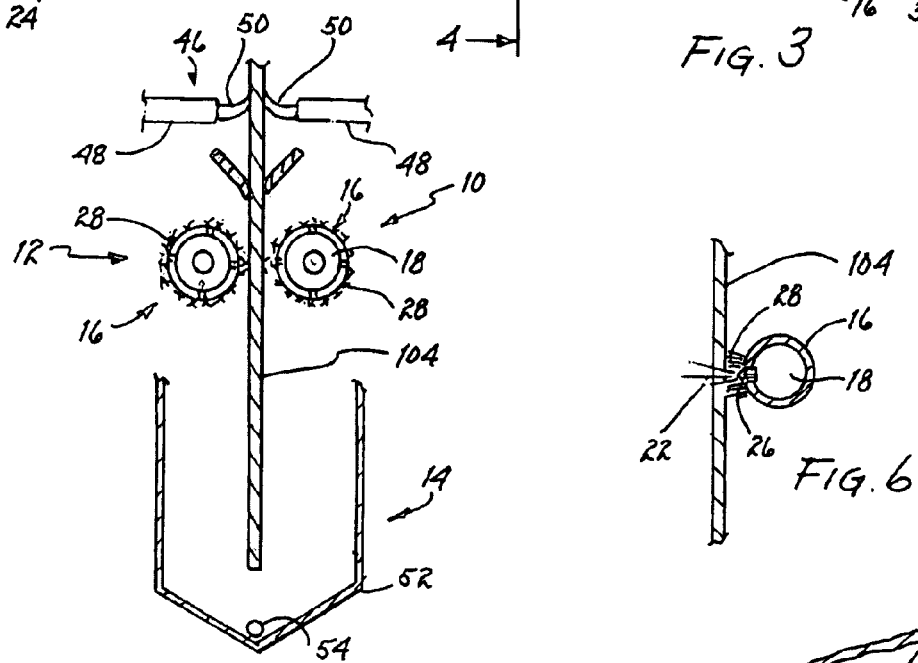
FIG. 4 is a side view of the side window washing device of the present invention.
Figure 6:
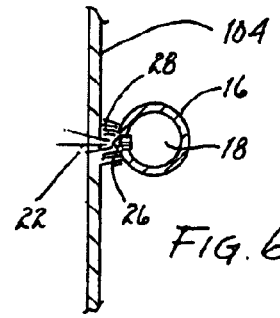
FIG. 6 is a cross-sectional view taken along lines 6-6 of half of the side window washing device of the present invention as depicted in FIG. 5.
Figure 5:
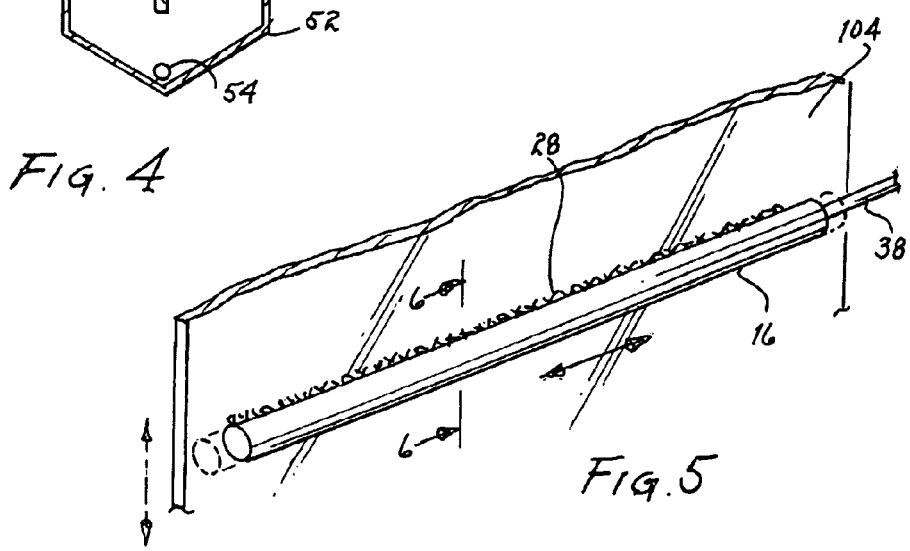
FIG. 5 is an elevated perspective view of half of the side window washing device of the present invention, the other half being positioned behind the side window.

The motor/pump 32 is further used to move the washing units 16 in either a rotational motion or a reciprocating motion such as an up and down or a side to side motion based on the design. In the embodiment depicted in the Figures, the motor/pump 32 is coupled to a gear system 40. The gear system 40 includes a main driving gear 42 coupled to the motor/pump 32. Each washing unit 16 has a second gear 44 coupled to an end section thereof. The second gear 44 is rotationally coupled to the driving gear 42. Thus, when the motor/pump 32 rotates the driving gear 42, the driving gear 42 will rotate the second gear 44 thereby rotating the washing unit 16. However, it should be noted that other types of devices besides the gear system 40 may be used to move the washing units 16 in either a rotational motion or a reciprocating motion such as an up and down or a side to side motion Positioned above each washing unit 16 and coupled to the interior of the door frame 100 is a drying unit 46. Thus, a drying unit 46 is placed on each side of the side window 104. The drying unit 46 will remove any liquid which is on the side window 104. In the embodiment depicted in FIG. 4, each drying unit 46 has a body section 48. A rubberized tip 50 is coupled to the end of the body section 48. The rubberized tip 50 will contact the side window 104. When the side window 104 is moved in either an up or down motion, the rubberized tip 50 will remove an liquid on the window similar to a squeegee.

Located below the washing units 16 is a collection pan 52. The collection pan 52 will be coupled to the interior of the door frame 100. The collection pan 52 is used to collect any liquid that may fall off the side window 104 or the washing units 16. The collection pan 52 will be slightly angled to help in the collection and drainage of the liquid. Located at a bottom section of the collection pan 52 is a drainage hole 54. The drainage hole 54 will allow the liquid to drain out of the door frame 100 of the vehicle 102 so that no rusting will occur.

In operation, each washing unit 16 is mounted in the interior of a door frame 100 of a vehicle 102. A mounting bracket 56 is coupled to the end 24 of the washing unit 16 opposite of the motor/pump 32. The mounting bracket 56 will secure the washing unit 16 to the interior of a door frame 100. The second end of the washing unit 16 is coupled to the gear system 40 which is also coupled to the will secure the washing unit 16 to the interior of a door frame 100. In order to clean the side window 104, a user must turn on the washing units 16. This is done through a switching mechanism 58 which is coupled to the motor/pump 32. The switching mechanism 58 is generally located in the interior of the vehicle 102. The switching mechanism 58 is used to activate the motor/pump 32. The motor/pump 32 will draw the liquid from the liquid reservoir 34 through the conduit 36 and transfer the liquid to each washing unit 16 via the second conduit 38. The liquid is then dispersed through the a plurality of spray nozzles 26 located along the length of the washing unit 16 to the side window 104. The motor/pump 32 will also rotate the washing units 16 so that the brushes 28 will be able to remove any debris which may be stuck on the side window 104. As the side window 104 is either moved up or down, the washing units 16 will clean each side of the side window 104. The drying unit 46 will then remove any excess liquid still on the side window 104.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A side window washing device for a vehicle comprising:
   a washing unit positioned on each side of the side window and coupled to an interior section of a door frame of the vehicle, each washing unit capable of dispensing a liquid and moving to clean the side window, wherein each washing unit comprises:
      a circular tube member having a channeling which runs from a first end through a majority of the length of an individual washing device for transferring the liquid through the individual washing device, said tube member having window contact element thereon for engaging and cleaning the window; and a plurality of spray nozzles coupled to the circular tube member and in fluid communication with the channeling for dispensing the liquid;

a driving unit coupled to the washing units for dispensing the liquid through the washing units and for moving the washing units; and a drying unit positioned above each washing unit and coupled to the interior section of a door frame for removing any liquid remaining on the side window.

2. A side window washing device for a vehicle in accordance with claim 1 further comprising a catch pan located below the washing units and coupled to the interior of the door frame for collecting any excess liquid.

3. A side window washing device for a vehicle in accordance with claim 2 further comprising a drainage hole formed in a bottom section of the catch pan for draining the excess liquid.

4. A side window washing device for a vehicle in accordance with claim 1 wherein each washing unit further comprises, as said contact elements, a plurality of brushes coupled to the circular tube member for removing any debris collected on the side window.

5. A side window washing device for a vehicle in accordance with claim 4 wherein the circular tube members rotate to clean the side window.

6. A side window washing device for a vehicle in accordance with claim 1 wherein the driving unit comprises:

a motor/pump;

a driving gear coupled to the motor/pump; and a second gear coupled to each washing unit.

7. A side window washing device for a vehicle in accordance with claim 6 wherein the driving unit further comprises a switching mechanism coupled to the motor/pump for activating and deactivating the side window washing device.

8. A side window washing device for a vehicle in accordance with claim 1 wherein each drying unit comprises:

a body section coupled to the interior of the door frame; and a rubberized tip coupled to the body section and in contact with the side window for removing any liquid remaining on the side window.

9. A side window washing device for a vehicle in accordance with claim 1 further comprising a fluid reservoir positioned in the interior of the door frame and coupled to the driving unit for housing the liquid dispensed through the washing unit.

10. A side window washing device for a vehicle comprising:

a washing unit positioned on each side of the side window and coupled to an interior section of a door frame of the vehicle, each washing unit capable of dispensing a liquid and moving to clean the side window wherein each washing unit comprises:

a circular tube member having a channeling which runs from a first end through a majority of the length of an individual washing device for transferring the liquid through the individual washing device, wherein the circular tube member rotates to clean the side window;

a plurality of spray nozzles coupled to the circular tube member and in fluid communication with the channeling for dispensing the liquid; and a plurality of brushes coupled to the circular tube member for removing any debris collected on the side window;

a driving unit coupled to the washing units for dispensing the liquid through the washing units and for moving the washing units;

a drying unit positioned above each washing unit and coupled to the interior section of a door frame for removing any liquid remaining on the side window;

a catch pan located below each washing unit and coupled to the interior of the door frame for collecting any excess liquid; and a drainage hole formed in a bottom section of each catch pan for draining the excess liquid.

11. A side window washing device for a vehicle in accordance with claim 10 wherein the driving unit comprises:

a motor/pump;

a driving gear coupled to the motor/pump; and a second gear coupled to each washing unit.

12. A side window washing device for a vehicle in accordance with claim 11 wherein the driving unit further comprises a switching mechanism coupled to the motor/pump for activating and deactivating the side window washing device.

13. A side window washing device for a vehicle in accordance with claim 10 wherein each drying unit comprises:

a body section coupled to the interior for the door frame; and a rubberized tip coupled to the body section and in contact with the side window for removing any liquid remaining on the side window.

14. A side window washing device for a vehicle in accordance with claim 10 further comprising a fluid reservoir positioned in the interior of the door frame and coupled to the driving unit for housing the liquid dispensed through the washing unit.

15. A side window washing device for a vehicle comprising:

a washing unit positioned on each side of the side window and coupled to an interior section of a door frame of the vehicle, each washing unit capable of dispensing a liquid and moving to clean the side window, wherein each washing unit comprises:

a circular tube member having a channeling which runs from a first end through a majority of the length of an associated washing device for transferring the liquid through the associated washing device, said tube member having window contact elements thereon for engaging and cleaning the window; and a plurality of spray nozzles coupled to the circular tube member and in fluid communication with the channeling for dispensing the liquid;

a driving unit coupled to the washing units for dispensing the liquid through the washing units and for moving the washing units; and a drying unit positioned above each washing unit and coupled to the interior section of a door frame for removing any liquid remaining on the side window.

* * * * *